United States Patent [19]

Kinghorn

[11] Patent Number: 4,916,857
[45] Date of Patent: Apr. 17, 1990

[54] CASTELLATED CHEMICALLY COATED SEEDLING BOX

[75] Inventor: James Kinghorn, Victoria, Canada

[73] Assignee: Beaver Plastics, Ltd., Alberta, Canada

[21] Appl. No.: 248,551

[22] Filed: Sep. 19, 1988

[30] Foreign Application Priority Data

Sep. 25, 1987 [CA] Canada .................................. 547855

[51] Int. Cl.⁴ ............................................... A01G 9/02
[52] U.S. Cl. .......................................... 47/66; 47/73; 47/77
[58] Field of Search ..................... 47/66, 73, 75, 77, 79

[56] References Cited

U.S. PATENT DOCUMENTS

| | | | |
|---|---|---|---|
| 4,510,712 | 4/1985 | Whitcomb | 47/66 |
| 4,753,037 | 6/1988 | Whitcomb | 47/77 X |
| 4,769,946 | 9/1988 | de Groot | 47/73 |

FOREIGN PATENT DOCUMENTS

1163807 3/1984 Canada .

OTHER PUBLICATIONS

"Toppling in British Columbia's Lodgepole Pine Plantations: Significance, Cause and Prevention", The Forestry Chronicle, Oct. 1986, vol. 62, No. 5, pp. 433-439. (by A. N. Burdett et al.).

Primary Examiner—Robert A. Hafer
Assistant Examiner—Lynda M. Cofsky
Attorney, Agent, or Firm—Wenderoth, Lind & Ponack

[57] ABSTRACT

A tree seedling container, constructed from expanded polystyrene, rectangular in shape and having cavities molded therein. The cavities are tapered from top to bottom and are open ended. The inner cavity walls are constructed in a castellated form having one or more raised portions extending vertically downwards the entire depth of the cavity. Grooved portions intersperse the raised castellated portions. Either one or the other of the grooved or raised portions is coated with a chemical to prune the lateral roots of a tree seedling which come into contact therewith.

7 Claims, 2 Drawing Sheets

CASTELLATED CHEMICALLY COATED SEEDLING BOX

DESCRIPTION OF THE INVENTION

This invention relates to seedling containers and particularly seedling containers which are constructed from expanded polystyrene and used for tree seedlings.

BACKGROUND OF THE INVENTION

In recent years, reforestation has become important and many lumbering concerns plant new tree seedlings after having harvested the forest. Tree seedings are started in nurseries and then transplanted when they reach a certain height. It has been found that trees which have been transplanted from the nursery to the field often lack the root stability of trees which have germinated and grown naturally. In particular, lodge pole pines which have been started in a tree nursery in man-made containers once transplanted, have toppled.

One problem in container grown seedlings is root spiralling. This occurs because the walls of the cavities constrict the tree's growth and produce root bound seedlings.

A typical tree seedling has both a tap root which goes vertically downwards and also lateral roots which generally grow horizontally. When the horizontal laterals reach the cavity walls, they begin to spiral about the tap root and consequently the tree commences its life after being transplanted with an unstable root system. To overcome this problem, downwardly extending ribs are molded into the inner cavity walls of the seedling container cavities. When the lateral roots hit the rib, they are directed downwards and roots spiralling is prevented. When the roots reach the bottom of the cavity which is open to the air, their growth is temporarily halted by air pruning.

This recent method has been found to produce superior root systems on tree seedlings but still has several disadvantages. In particular, because all of the lateral roots are directed vertically downwards around the tap root, tree seedlings once transplanted tend to suffer rotation and can topple in a strong wind. This is due to the lack of horizontal lateral roots.

DESCRIPTION OF THE PRIOR ART.

Canadian Patent 1,163,807, although not directed to an expanded polystyrene container, discloses a container having a number of individual compartments which are made of a plurality of mutually spaced depending converging strips defining slits. The seedling and growth medium is placed in this stripped cavity. When some of the lateral roots grow outwardly between the strips, they are air pruned. The air pruned horizontal laterals recommence to grow horizontally after the seedling is transplanted. The invention disclosed in Canadian Patent 1,163,807 overcomes some of the root growth problems but is more expensive and cumbersome than a container made of expanded polystyrene.

Research in a different area to overcome the root growth problem has been done by Burdett et al. and published in a paper entitled "Toppling in British Columbia's Lodge Pole Pine Plantations: Significance, Cause and Prevention". The article appeared in the October 1986 edition of the Forestry Chronicle. The authors conducted experiments using chemical root pruning. By coating the entire seedling box and inner walls of the cavities of the seedling container with latex paint containing cupric carbonate, the authors found that when the horizontal lateral roots touched the painted surface of the cavity walls, the roots stop growing, i.e. they are pruned. Once the seedling is transplanted, the horizontal laterals continue their course as before without the impediment of the cavity walls.

In South Africa similar experiments have been conducted using copper painted containers.

This method of chemically coating the cavity walls has several disadvantages. Firstly, the chemical coating prevents any vertically downwards directed lateral roots because of the pruning effect on all lateral roots which touch the cavity walls. This gives a weaker root ball when the seedling is transplanted than a naturally grown seedling. Secondly, the chemical coating of the entire container is expensive and therefore uneconomical. Thirdly and most important, the abundance of chemicals in the root cavity when mixed with differing soils and excessive moisture levels can cause p.h. fluctuations in the soil which are not suitable for good growth. This can seriously harm or even kill the seedling if chlorosis occurs.

It is an object of the present invention to produce a tree seedling container which produces tree seedlings with horizontal chemically pruned lateral roots, air pruned vertically downward directed lateral roots, and a strong tap root. It is a further object of the invention to produce a tree seedling container which produces tree seedlings that once transplanted, have stable, strong root systems which will prevent toppling of the tree as it matures.

SUMMARY OF THE INVENTION

In the present invention only a portion of a cavity wall is chemically coated. Rather than narrow downwardly directed ribs, the present invention provides a castellated form. In a preferred embodiment, three vertical raised portions and three vertical grooved portions defined by said raised portions make up the inner cavity wall. Either the raised portions or the grooved portions of the inner cavity walls receive a chemical coating during production. Copper paint or latex paint containing cupric carbonate are preferred, but any suitable root pruning chemical can be used. Also, the cavities are downwardly tapered and are open at the bottom. This allows for easy removal when replanting the tree seedlings.

Therefore, this invention seeks to provide a seedling container constructed from expanded thermal plastics, comprising a plurality of cavities suitable for holding soil medium for propogating tree seedlings; said cavities being open-ended and having their axes in substantially the vertical plane; wherein 30% to 70% of the inner walls of said cavities are coated with a suitable root pruning chemical.

The invention also seeks to provide a method of propogating tree seedlings comprising the steps of (a) applying a suitable root pruning chemical to 30% to 70% of the inner walls of a seedling cavity in a seedling container; (b) filling said cavity with a growing medium and inserting at least one seed; and (c) applying sufficient heat, light and moisture to provide ideal growing conditions.

In operation, the tree seedling containers are filled with a suitable growing medium and seeds are placed in each cavity. As a seedling begins to grow, it sends out both a tap root and horizontal lateral roots. When the horizontal lateral roots strike the chemically coated portions of the inner walls, they are chemically pruned. Other lateral roots come in contact with the non-chemically coated portion of the cavity wall and are directed vertically downwards while at the same time prevented from spiralling because of the raised portions. These roots become vertically downward directed lateral roots. The tap root grows downwards until it is air pruned when it reaches the lower opening. The downwardly directed vertical laterals are also air pruned once they reach the bottom of the cavity.

The resultant seedling, once transplanted has a well structured natural root system. The chemically pruned horizontal lateral roots recommence their growth in the same direction they held prior to coming into contact with the cavity walls and provide stability to prevent rotation of the tree. The vertically downwardly directed lateral roots are free to grow downwardly and outwardly and seek new soil horizons. The tap root also continues its downward course.

BRIEF DESCRIPTION OF THE DRAWINGS

The invention is more fully described in conjunction with the following drawings wherein.

DETAILED DESCRIPTION OF THE INVENTION

Figure 1:
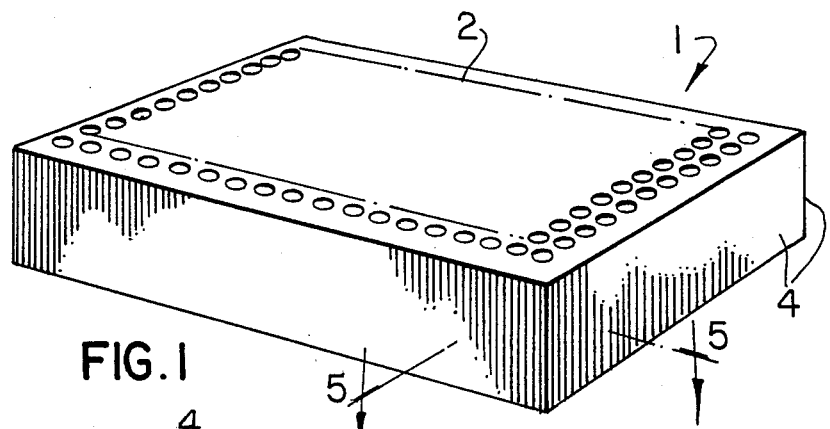
FIG. 1 is a perspective view of the seedling container of the present invention.
Figure 2:
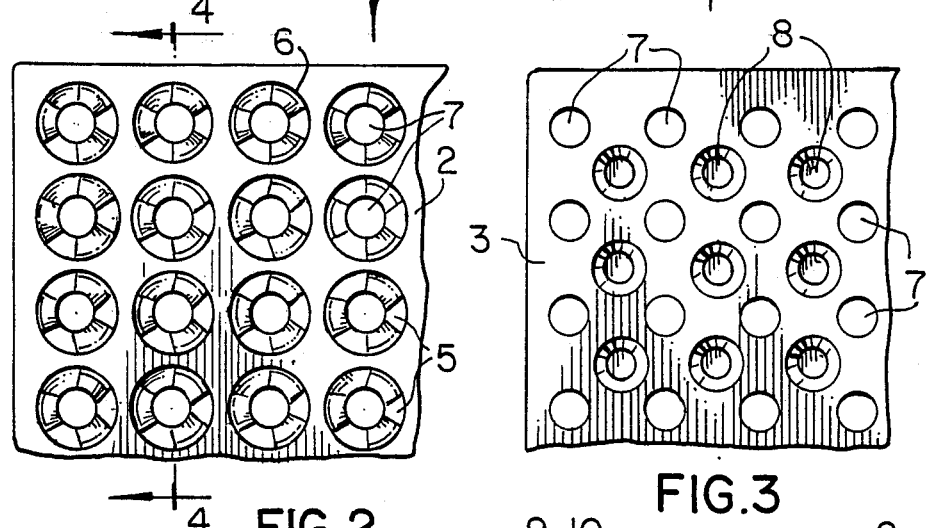
FIG. 2 is a top view of the seedling container.

In FIGS. 1 and 2, an expanded polystyrene seedling container 1 is rectangular in shape and approximately a half foot deep. It has a top 2, a bottom 3, and four side walls 4. Open ended cavities 5 are conically shaped with top openings 6 being larger that the bottom openings 7.

Figure 3:
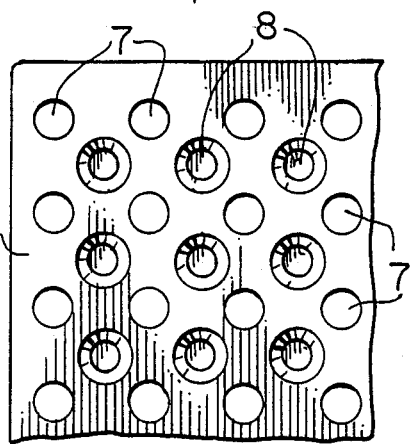
FIG. 3 is a bottom view of the seedling container.

FIG. 3 shows other holes or cavities 8 molded in the bottom side 3 of the container. These holes 8 lessen the amount of the EPS material, and therefore cost, and also lend stability to the structure.

Figure 4:
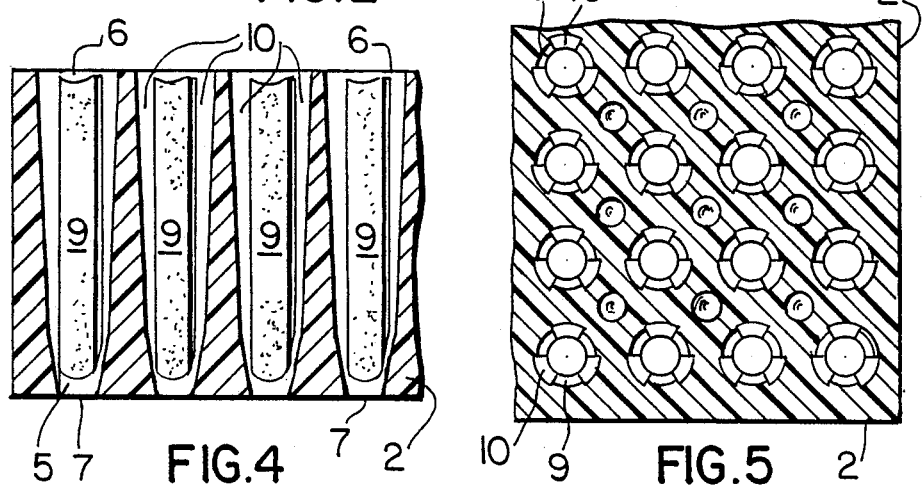
FIG. 4 is a vertical cross-section along line 4—4 in FIG. 2.
Figure 5:
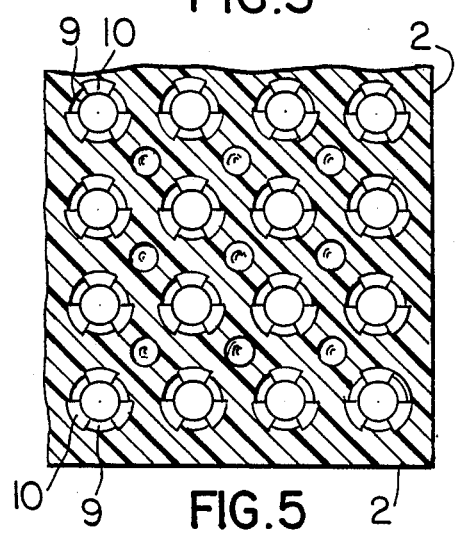
FIG. 5 is a horizontal cross-section along line 5—5 in FIG. 1.
Figure 6:
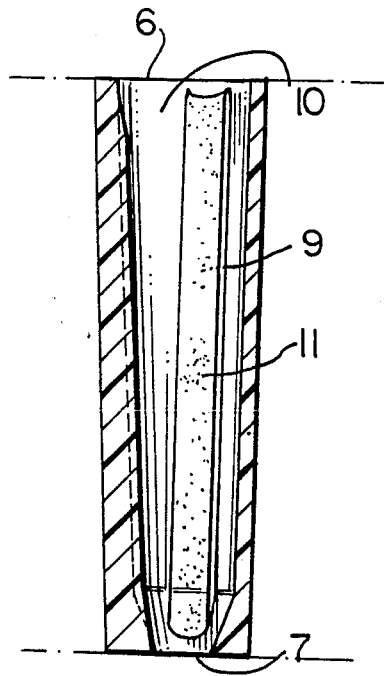
FIG. 6 is an enlarged view of a single seedling cavity from cross-section 4—4.

In FIGS. 4, 5, and 6, the castellated form of inner walls of each seedling cavity is shown. There are raised portions or bands 9 which thereby define grooved portions 10. The grooved and raised portions define peripheral faces joined by radially extending portions and run vertically up and down the inner walls of the cavity and end at openings 7 and 6. A chemical coating 11 is applied to the raised portions by any suitable production application technique.

The chemical can be any suitable root pruning agent, such as copper paint, or latex paint containing cupric carbonate. In operation, the container is placed in a suitable location in a nursery or outdoors and cavities 5 are filled with planting medium. A tree seed is placed in the planting medium. As the seedling grows, the tap root reaches down towards the bottom opening 7 in each cavity 5. Its horizontal lateral roots which strike the raised portion 11 and chemical 12 are chemically pruned. Other lateral roots strike grooved portion 10 and are directed downwardly between raised portions 9. These are air pruned when they reach the opening 7.

Alternative embodiments of the invention include different configurations of raised or grooved portions in the inner cavity wall as well as other configurations of the cavities where at least some proportion of the cavity wall is chemically coated.

What I claim as my invention is:

1. A seedling container comprising a plurality of cavities suitable for holding soil medium for propagating tree seedlings; said cavities each having an opening in the bottom thereof and having substantially vertical longitudinal axes; the inner wall of each of said cavities including raised and lowered portions in the form of a castellated construction, said raised portions comprising downwardly directed raised bands which thereby define interspersed grooves which comprise said lowered portions; said bands and said grooves defining peripheral faces joined by radially extending portions; and a suitable root pruning chemical applied to alternate ones of said faces.

2. A seedling container as claimed in claim 1 wherein said bands are of substantially the same width and length as said grooves.

3. A seedling container as claimed in claim 2 wherein said raised bands and said grooves continue substantially from the top to the bottom of said cavity.

4. A seedling container as claimed in claim 1 wherein said cavities are conically shaped, being tapered inwardly at the bottom, such that the top opening is larger in diameter than said bottom opening.

5. A seedling container as claimed in claim 1 wherein said alternate ones of said faces are said faces defined by said raised bands.

6. A seedling container as claimed in claim 1 wherein said alternate ones of said faces are said faces defined by said grooves.

7. A method of propagating tree seedlings, comprising the steps of:
providing a seedling container, said seedling container comprising a plurality of cavities suitable for holding soil medium for propagating tree seedlings; said cavities each having an opening in the bottom thereof and having substantially vertical longitudinal axes; the inner wall of each of said cavities including raised and lowered portions in the form of a castellated construction, said raised portions comprising downwardly directed raised bands which thereby define interspersed grooves which comprise said lowered portions; said bands and said grooves defining peripheral faces joined by radially extending portions; and a suitable root pruning chemical applied to alternate ones of said faces;
filling at least one of said cavities with a growing medium;
inserting a seed within said growing medium; and
subjecting said growing medium to sufficient light, heat and moisture to constitute normal growing conditions.

* * * * *